United States Patent
Heidrich et al.

[11] Patent Number: 6,061,481
[45] Date of Patent: May 9, 2000

[54] OPTOELECTRONIC CIRCUIT

[75] Inventors: Helmut Heidrich; Ronald Kaiser; Michael Hamacher, all of Berlin, Germany

[73] Assignee: Heinrich-Hertz-Institut fuer Nachrichtentechnik Berlin GmbH., Berlin, Germany

[21] Appl. No.: 08/981,348

[22] PCT Filed: Jun. 19, 1996

[86] PCT No.: PCT/DE96/01129

§ 371 Date: Dec. 19, 1997

§ 102(e) Date: Dec. 19, 1997

[87] PCT Pub. No.: WO97/00460

PCT Pub. Date: Jan. 3, 1997

[30] Foreign Application Priority Data

Jun. 19, 1995 [DE] Germany .......................... 195 22 591

[51] Int. Cl.$^7$ ............................................ G02B 6/12
[52] U.S. Cl. ........................... 385/14; 385/16; 385/31; 385/37; 385/42
[58] Field of Search ..................... 385/14–31, 37, 385/42–46; 359/127, 130

[56] References Cited

U.S. PATENT DOCUMENTS 5,825,520 10/1998 Huber ................................ 385/37 X

FOREIGN PATENT DOCUMENTS 2241130 8/1991 United Kingdom .

OTHER PUBLICATIONS

Optical Fiber Communication,Summaries of Papers Presented at the Conference OFC, '95, San Diego, Feb. 26–Mar. 3, 1995, vol. 8, 26. Feb. 1995, Institute of Electrical and Electronics Engineers, p. 140, Yamada, Y. et al. "FDM Optical–Loop Buffer and its Applications to a Photonic ATM Switch: Frontier Net" (cited in application).

Ragdale et al.: Integrated Three Channel Laser and Optical Multiplexer for Narrowband Wavelength Division Multiplexing, Electronics Letters 1994, vol. 30, No. 11 (cited in application).

*Primary Examiner*—Phan T. H. Palmer
*Attorney, Agent, or Firm*—Karl Hormann

[57] ABSTRACT

The invention concerns optoelectronic circuits for an optical wavelength multiplexing system, the circuits being constructed with optical couplers (11; 39.2, 39.4) each having four branches (1,2,3, 4; 39.1, 39.3, 2×39.5; 2×39.6, 39.3, 39.7). Electrical and optical crosstalk is minimized both in integrated (FIG. 1) and hybrid (FIG. 5) constructions. To this end, photo diodes (6', 6"; 36) and laser diodes (5; 38) are each disposed on opposite sides of the couplers (11; 39.2, 39.4) and mutually decoupled by wavelength-selective arrangements of gratings (8, 10', 10") or filter plates (35). The circuits can be designed for bidirectional operation (FIG. 1) and for cascadable modules for multiplexers/demultiplexers with an add-drop function (5) and enable transmission and reception to be carried out simultaneously.

27 Claims, 5 Drawing Sheets

OPTOELECTRONIC CIRCUIT

BACKGROUND OF THE INVENTION

1. Field of the Invention

The invention relates to optoelectronic circuits for simultaneous transmitting and receiving operation in a wavelength multiplex process, in a structure in which the relative position of active circuit components determines their operating mode. Single-stage as well as multi-stage circuits with a light waveguide arrangement and light signal detectors and light signal sources as active circuit elements for bidirectional and unidirectional transmitting and receiving operations will be disclosed. The circuits may be structured as integrated or hybrid circuits.

2. Discussion of the Prior Art

A bidirectional optical transmitting and receiving device is known from British patent specification GB-A-2,241,130 provided with an optical duplexer having a waveguide coupling device structured as a quadruple gate. Two gates of the quadruple gate at the same connection side are connected to the active circuit components for transmitting and receiving. The other two gates at the other connection side lead, on the one hand, to an external waveguide and, on the other hand, to a phase shifter. For the reduction of interfering effects between transmitting and receiving components, complementary signals are used which are guided through the actually unnecessary fourth gate and are made available by reflection at a reflecting surface and at the phase shifter.

The state of the art from which the invention is proceeding, is known from Ragdale, C. M., Reid, T. J., Reid D. C. J., Carter, A. C.: Integrated three channel laser and optical multiplexer for narrowband wavelength division multiplexing, Electronics Letters 1994, Vol. 30, No. 11. A wavelength multiplexer is described there which permits unidirectional multi-channel data transmission through a light waveguide. In this respect, the following details are set forth in greater detail:

The wavelength multiplexer is provided with three lasers each of which energizes a transmission channel. The separation between the wavelengths of the lasers, i.e. the channel spacing, amounts to about 5 nm.

The lasers are connected to a signal output by way of several 3 dB couplers, light waveguides and wavelength-selective grating reflectors, at which output the light signals emitted by the lasers are coupled to an external light waveguide. The multiplexer is structured as an optoelectronic integrated circuit, i.e. all structural components are integrated on a chip.

Each 3 dB coupler is connected with four branches of light waveguides, the branches being positioned in opposite pairs. Thus, the first branch and the second branch are arranged opposite the third and fourth branches, respectively.

The first laser of wavelength $\lambda_1$ is connected to the first branch of the 3 dB coupler. Hence, 50% of the light signals emitted by the first laser are coupled into each of the third and fourth branches of the 3 dB coupler. A wavelength-selective grating reflector reflecting light of wavelength $\lambda_1$ and being transparent to light of any other wavelength, is arranged in each of the third and fourth branches of the first 3 dB coupler. Thus, the light emitted by the first laser is reflected by the grating reflectors and passes through, or transverses, the coupler again in the opposite direction. The light emitted by the first laser is coupled almost entirely into the second branch to which the signal output of the multiplexer is connected. Since the first 3 dB coupler couples almost the entire light reflected at the grating reflectors into the second branch, not only is interference of the laser by light returning to the first branch prevented but the efficiency during transmission is also improved.

The first laser, the first 3 dB coupler and the first wavelength-selective grating reflector are part of a first stage which energizes the first channel with wavelength $\lambda_1$. Following this first stage, there is arranged an analogously constructed second stage, the laser of the second stage transmitting light of wavelength $\lambda_2$ and the wavelength-selective grating reflector of the second stage reflecting light of wavelength $\lambda_2$.

The second branch of the second stage is connected by a further 3 dB coupler to the third and fourth branches of the first 3 dB coupler of the first stage. The light emitted by the laser of the second stage is therefore coupled at 50% each into the third and fourth branch of the first 3 dB coupler of the second stage, by the 3 dB coupler of the second stage. It is there reflected at the wavelength-selective grating reflectors and coupled almost entirely into the second branch of the second stage. The 3 dB coupler arranged between the first and second stages couples 50% of the light emitted by the second stage into the third and fourth branches, respectively, of the first 3 dB coupler of the first stage. There, the light from the second stage passes through the wavelength-selective grating reflectors since these are tuned to the first wavelength $\lambda_1$, and is coupled almost entirely into the second branch of the first stage by the first 3 dB coupler of the first stage. It is thus fed to the signal output of the multiplexer.

A fourth 3 dB coupler is arranged following the second stage, the third and fourth branches of this fourth 3 dB coupler being respectively connected to the third and fourth branch of the 3 dB coupler of the second stage. A third laser emitting light of wavelength $\lambda_3$ is connected to the first branch of the fourth 3 dB coupler. Hence, the light emitted by the third laser passes through the two wavelength-selective grating reflectors of the first and second stages, respectively, and is in the end coupled at the signal output into the external light waveguide.

Accordingly, the multiplexer is constructed of three stages, each stage energizing one channel with light signals. This described wavelength multiplexer allows unidirectional multi-channel date transmission by way of a light waveguide, that is to say it allows multi-channel transmission. The arrangement may also be constructed and operated as a wavelength demultiplexer. The arrangement does not, however, permit simultaneous operation as a transmitter and as a receiver, even, if necessary, by way of a single light waveguide.

TASK OF THE INVENTION

It is a task of the invention to provide optoelectronic circuit arrangements for transceivers as well as multiplexers or demultiplexers for data transmitted by wavelength multiplexing, which also satisfy an "add/" function, i.e. by being capable, for instance, of newly charging channels carrying data which may be deleted at the receiving location with data generated at the receiving location. These circuits are to be made available in large quantities, for instance as integrated circuits, as well as in small quantities, which may be assembled from individual modules, at economically feasible fabrication efforts.

SUMMARY OF THE INVENTION

In the ensuing description terminology may be used which will different in appearance but is of the same meaning as the terminology used in the independent claims. More particularly, this relates to the term "branch" which has the same meaning as "waveguide branch".

The invention includes the technical teaching of minimizing electric and optic cross-talk in the case of a laser, a photo-diode and a 3 dB coupler integrated on a chip as well as in the case of a hybrid construction from individual components, with the 3 dB coupler either blocking light signals at the signal input or feeding them to the photo-diode, the photo-diode and the laser being arranged at opposite sides of the circuit to reduce electric cross-talk between them.

As the light signal source is electrically operated with high-speed modulating constrained current, an electromagnetic field is formed in the vicinity of the light signal source when the circuit is operated as a transmitter, which may cause cross-talk with the light signal detector or its output conduit and thus interfere with its output signal. To minimize this electric cross-talk, the light signal source is therefore spaced from the light signal detector, the two components being positioned at opposite sides of the circuit. Moreover, the arrangement of wavelength-selective components also reduces optical cross-talk from the light signal source to the light signal detector.

Electrooptic circuits in accordance with the invention make possible simultaneous operation as transmitters and receivers by a wavelength multiplexing process. During such operation, such a circuit is transmitting and receiving at different wavelengths. Preferably, the transmission and receiving waves lie within optical windows at 1,500 nm or 1,300 nm, i.e., within the so-called third optical window of glass where light absorption and, therefore, attenuation of the light waveguide are relatively low. Using these wavelengths makes it possible, therefore, to transmit data at relatively low transmission power or without intermediate amplifiers (repeaters) over large distances.

A circuit which does not only detect received signals is provided with a light signal source for emitting light signals when operating in a transmission mode. In preferred embodiments of the invention a single-mode laser is used emitting light in one fundamental mode only.

Furthermore, a circuit which does not only generate data to be transmitted is provided with a light signal detector which converts the light signals received through the light waveguide into electrical signals and renders them accessible at contact connections at the exterior of the circuit housing.

For coupling to a bidirectionally operated transmission network, an optoelectric circuit in accordance with the invention is provided with a common interface for connection of the external light waveguide by means of which the data is transmitted. For coupling to a unidirectional transmission network as well as for cascading, there are provided separate interfaces at each component for connection of the external light waveguides which either conduct data streams to be received or to be internally transmitted or externally transmitted.

In a prefered embodiment of the invention of a light waveguide arrangement for bidirectional transmission the first branch is connected to the common interface, the second branch is connected to the light signal source, and the third and/or the fourth branch is connected to a light signal detector. This light waveguide arrangement makes it possible to transmit to the light signal detector the light signals received by way of the external light waveguide and entering at the common interface, or to transmit the light signals emitted by the light signal source to the common interface, as the case may be, and to couple it into the external light waveguide.

In accordance with the invention, the light signal source and the light signal detector are arranged on opposite sides of the circuit. Accordingly, the second branch is positioned opposite the third as well as the fourth branch of the light waveguide arrangement.

The four branches of the light circuit arrangement are connected to each other by an optical coupler. Two of the branches are connected to the coupler at one side thereof, and the other two branches are connected to the coupler at the opposite side thereof. A light signal entering the coupler from one branch is thus coupled to the branches connected to the opposite side, the coupler having a 1:1 division ratio, i.e. it couples the light signal from a given branch at a 50% intensity into the two opposite branches. Therefore, the coupler is a 3 dB coupler.

In a prefered embodiment of the invention the coupler is structured as a 3 dB MMI coupler (MMI=Multi-Mode-Interference). The 3 dB-MMI coupler is provided with a multi-mode section made from light-conducting material, the four branches of the light waveguide arrangement being connected thereto in pairs at two opposite side surfaces of the multi-mode section. Depending upon the length of the multi-mode section the coupler either operates in a so-called cross-state, a bar state or in an intermediate state.

In the bar state, the electromagnetic field at the input of the multi-mode section is imaged at, or transfered to, the output of the multi-mode section. Thus, a light signal present at a branch at the input of the coupler is coupled into the straight ("bar") opposite branch.

By contrast, in the cross state image of the electromagnetic field the input of the multi-mode section appears inverted at the output. A light signal present at a branch at the input of the coupler is therefore coupled into the oblique ("cross") opposite branch at the output.

The 3 dB state is an excellent intermediate state. In this state, a light signal present at one branch at the input of the coupler is coupled in equal shares into the two opposite branches, the two output signals having a phase difference of $\lambda/4$. If, therefore, the two output signals are reflected at the output, for instance by a waveguide grating or by a filter plate, the light signal will pass through the coupler again in the opposite direction and the light is coupled in equal shares into the two input branches. As a consequence of the phase difference this will result in an extinction in one input branch of the coupler. Such couplers are characterized in an advantageous manner by a relatively high fabrication tolerance.

In another embodiment of the invention the coupler which connects the different branches of the light waveguide arrangement to each other, is a 3 dB directional coupler. In a light waveguide the light is totally reflected at the interfaces to the ambient medium. However, the light does penetrate the ambient medium up to the so-called depth of penetration. If a second light waveguide is then moved towards the first light waveguide until the spacing between he light waveguides is less than the depth of penetration, the light may transfer between the two light waveguides without significant changes in the direction of the light rays.

In a variant of the invention, the monolithically integrated optoelectronic OEIC circuit (optoelectronic integrated circuit) serves as a bidirectional transmitter/receiver ("transceiver"). Here, too, the first and second branches of the light waveguide arrangement are positioned at the same side of the coupler; the third and fourth branches are positioned at the side opposite thereto. In this variant, the coupler couples a light signal entering a common interface in equal propositions into the third and fourth branches. In this variant, a wavelength-selective reflector is arranged in the third and fourth branches between the light signal detector and the coupler. Depending upon the wavelength of the light, the reflector either reflects substantially entirely or it is transparent. In this variant the reflector is designed so that light of the transmission wave length is almost entirely reflected, whereas light of the receiving wavelength passes almost entirely.

In the receiving mode of the circuit, a light signal of the receiving wavelength present at the interface is coupled from the first branch into the third and fourth branches where it passes the wavelength-selective reflector almost unattenuated and in this manner it arrives at the light signal detector.

By contrast, in the simultaneously possible transmission mode the light emitted by the light signal source is coupled in equal propositions from the second branch into the third and fourth branches where it is almost entirely reflected by the wavelength-selective reflector and thereafter it passes through the coupler in the opposite direction. The light signal is thus coupled from the third and fourth branches into the first branch and arrives at the common interface where the light signal is coupled into the external light waveguide and is thus transmitted.

In this connection, it is important that the coupler does not again couple the light reflected at the wavelength-selective reflectors in the third and fourth branches into the second branch connected to the light signal source. This is of particular importance when a single-mode laser is used as the light signal source, since the operation of the laser would be disturbed by returning light.

In the above-described variant of the invention structured as a bidirectional transmitter/receiver ("transceiver-OEIC"), the light signal source and the light signal detector are arranged in opposite relationship to the coupler coupling the light emitted by the light signal source into the branch of the light signal detector. For this reason, there is a possibility of cross-talk from the light signal source to the light signal detector. Such optical cross-talk is reduced by arranging a wavelength-selective reflector reflecting light of the transmission wavelength, in front of each light signal detector. However, even for light of the transmission wavelength the degree of reflection of the reflector is not one hundred percent exact, so that part of the light emitted by the light signal source will reach the light signal detector and will lead to optical cross-talk, albeit very little.

In one embodiment of the invention, for further reducing optical crosstalk, there is provided a band-pass filter stop in the third and/or fourth branch between the light signal detector and the wavelength-selective reflector, the filter passing light of a wave length other than the transmission wavelength substantially unattenuated. In this connection, it is important that the band width of the band-pass filter stop is smaller than the channel spacing between the transmission wavelength and the receiving wavelength so that the transmission wavelength may be selectively filtered out without detrimentally affecting the reception of the photo diode on the receiving wavelength.

In one embodiment of the invention optical cross-talk from the light signal source to the light signal detector is prevented by structuring the third and fourth branches of the light waveguide arrangement at the output of the band-pass filter stops such that light of the transmission wavelength cannot propagate in the third and fourth branches. Thus, in a light waveguide of limited cross-section only those waves can propagate the wavelength of which is less than the so-called cut-off wavelength of a given light waveguide, the cut-off wavelength being dependent on the cross-section of the ligh waveguide, among others. The gage of the light waveguide in the third and fourth branches of the light waveguide arrangement behind the band-pass filter stops is thus chosen so that the transmission wavelength is below the cut-off wavelength whereas the receiving wavelength is above the cut-off wavelength. In that case, although the light emitted by the light signal source is still coupled into the third and fourth branches by the coupler, yet it cannot there propagate behind the band-pass filter stops and, therefore, does not reach the light signal detector.

Complementary transceivers are part of complete systems equipped with such transceivers. If the previously described transceiver is transmitting at a wavelength of 1.5 $\mu$m and receiving at a wavelength of 1.3 $\mu$m, the complementary receiver has to operate at a wavelength of 1.3 $\mu$m for transmission and 1.5 $\mu$m for receiving. Embodiments of the invention also include such complementary transceivers. To this end, in a circuit having a light signal source at the second branch and light signal detectors at the third and/or fourth branch of the light waveguide arrangement, the third and the fourth branch are provided with an absorption element consisting of a semiconductor layer covering the waveguides in the areas abutting the light signal detectors. The semiconductor material is transparent for wavelengths of 1.5 $\mu$m; but it absorbs lightwaves having a wavelength of 1.3 $\mu$m. This may be, for instance, a quaternary layer having a band gap corresponding to 1.4 $\mu$m. With this arrangement too, two-stage filtering is achieved which ensures comparable values for optical cross-talk dampening.

In a preferred embodiment of the invention the light signal generator is a photo diode. A primary method of reducing optical cross-talk provides, for instance for a transceiver circuit of the kind heretofore described first, for fabricating the photo diode from a semiconductor material which is insensitive to light of the transmission wavelength. For instance, a certain composition of InGaAsP semiconductor compound displays an energy band gap corresponding to a wavelength of 1,400 nm. If the transmission wavelength is 1,500 nm, the quantum energy of the radiation will be insufficient to bridge the energy band gap of the photo diode and to cause the detector to react. The light emitted by the light signal source is therefore not detected by the photo diode. If, however, the receiving wavelength is 1,300 nm the quantum energy corresponding to this wavelength exceeds the energy band gap of the semiconductor material so that light of the receiving wavelength will be detected by the photo diode. Two conditions must be satisfied in respect of this possibility of reducing optical cross-talk. Firstly, the transmission wavelength has to exceed the receiving wavelength and, secondly, the wavelength corresponding to the energy band gap of the used semiconductor material has to be between the transmission and receiving wavelengths.

In one variant of inventive significance a light signal detector is divided into a first section of quarternary material and a second section of ternary material connected in series therewith. The second section detects light signals of a wavelength of 1,500 nm and thus assumes the functions of the receiver for bidirectional services. The first section detects additionally received light signals at 1,300 nm which may be heterodyned with the bidirectional services for purposes of distribution, signaling and the like.

Moreover, there is a strong possibility that the light emitted by the light signal source will be dispersed or scattered within the chip and thus reach the light detector and distort the output signal. For that reason, in one variant of the invention absorbers absorbing light of the transmission wavelength are arranged laterally of the light signal source and/or the light signal detectors, possibly formed as marginal structures at the chip border. The absorbers may, for instance, be made from a special semiconductor material which absorbs light of the transmission wavelength.

In another variant of the invention of inventive significance, the circuit in accordance with the invention is structured as an optoelectronic add/drop circuit (add/drop OEIC). This circuit set up as a Mach-Zehnder arrangement serves to decouple and detect ("drop function") light signals of a certain wavelength from a light waveguide and thereafter to couple a new signal of this wavelength into the light waveguide ("add function"). For this purpose, this circuit is provided with a receiving interface to which is connected a first light waveguide for receiving light signals, and a transmission interface to which a second light waveguide is connected for transmitting transmitted new light signals of the same wavelength or of light signals yet to be detected of another wavelength.

In common with the previously described variants of the invention this add/drop OEIC is provided with a light waveguide arrangement which is, however, constituted of several series-connected couplers each provided with branches arranged in oppositely positioned pairs. A light signal entering at the receiving interface is fed to the first optical coupler of the series connection connected to the receiving interface for coupling the light in equal shares into the opposite branches. There the light signal is reflected in the two branches at two successively arranged wavelength-selective reflectors tuned to the given receiving wave length, and again passes in the opposite direction through this coupler. The light signal is thus coupled into the other branch of that pair one branch of which is connected to the receiving interface. That is where the photo diode is positioned. Preferably, a TE light polarization grating and a TM light polarization grating are arranged in each branch to provide polarization-dependent operation.

If the wavelength of the light signal to be detected by the photo diode does not conform to the wavelength to which the wavelength-selective reflectors have been tuned, the light signal will traverse the two reflector almost unattenuated and is heterodyned to a sum signal by the second coupler of the series connection, and is also coupled into one of the two opposite branches at the other side of the second coupler. This branch is connected to a transmission interface to which a second "external" light waveguide is connected. A light signal the wavelength of which does not correspond to the wavelength of reflection of the wavelength-selective reflectors in an ideal case transverses the add/drop circuit unattenuated and is coupled into the second external light waveguide at the transmission interface.

The other branch of the previously mentioned pair is connected to a laser diode which in a state of transmission emits a light signal with the wavelength-selective reflectors being tuned to the wavelength of this laser diode. The light signal emitted by the laser diode thus initially traverses the second coupler of the series-connection and is there coupled in equal shares into the two opposite branches at another side. There the signal is almost totally reflected at the two wavelength-selective reflectors and traverses the second coupler again in the opposite direction. In an ideal case the total intensity of the light signal to be transmitted is coupled into that branch which is connected to the transmission interface.

In one variant of the invention of inventive significance several add/drop circuits are cascaded as stages, the receiving interface of each succeeding stage being connected to the transmission interface of the stage preceding it. In that arrangement the wavelength-selective reflectors of the individual stages are tuned to different wavelengths, so that a channel of a defined wavelength may be detected (drop) in each stage and charged (add) with a new signal in the corresponding following stage.

In a further variant of the invention of its inventive significance the wavelength-selective reflectors are structured as grating reflectors, the surface of the waveguide being formed as a Bragg grating. As has been described supra, the individual branches of the waveguide arrangement are integrated on a chip together with the light signal source and the light signal detector. The grating reflector is formed by a corrugated, i.e. wave-like interface between the light waveguide and the surrounding material.

In such an arrangement the optical behavior of such a grating reflector is dependent upon the wavelength of the incident light. If the wavelength equals twice the distance between two crests of the corrugated structure, also known as the corrugation period, the grating reflector will act as a Bragg reflector and reflect nearly one hundred percent of the incident radiation. If, however, the wavelength of the incident radiation differs from the double corrugation period the light will pass more or less unattenuated. By suitably structuring the interface between the light waveguide and the surrounding material the wavelength may thus be set at which the grating reflector will reflect the incident light. The reflection and transmission properties of the grating reflector may be set by the length of the grating and the depth of the troughs, i.e. by the ripple or corrugation of the interface.

As has been described supra, in one variant of the invention a bandpass filter stop is arranged in front of the light signal detector in order to reduce optical cross-talk from the light signal source to the light signal detector. In one embodiment of the invention this band-pass filter stop, too, is formed as a Bragg grating.

A special variant of the invention aims at the tuning properties of the wavelength-selective grating arrangements and of the mono-mode laser diodes. If in their immediate vicinity they are provided with heating elements, the filter characteristics or the emitted wavelengths may be shifted to greater wavelengths at increasing temperatures and vice versa. Such heating elements may be arranged to cover absorber layers of the kind previously mentioned. Such a measure makes it possible also to compensate for possible deviations in the component properties as a result of unavoidable fabrication tolerances and thus to optimize the overall performance. In respect of cascading components such an adjustability of wavelength-selective elements assumed particular significance. The heating elements may be fabricated in integrated circuits in separate fabrication steps, parallel to the appropriate waveguide structures. The effect of shifting of emission wavelengths of monomode lasers is about 0.1 mm/° C.

Whereas the previous explanations on the whole relate to integrated circuits in accordance with the invention, the major differences to be observed in respect of hybrid circuit structures will be described in greater detail hereinafter.

The above captioned embodiments of the invention relate to integrated optoelectronic circuits in which the wavelength-selective filters are structured as reflectors, e.g. grating or Bragg reflectors as well as band-pass filter stops. The above described alternative to an integrated circuit structure which will hereafter be described in greater detail, in a hybrid planar-optical structure provides for dielectric filter plates as wavelength-selective filters of a light waveguide arrangement. Of course, in such an arrangement the light signal detectors on the one hand and the light signal source on the other hand are arranged at opposite sides of the optical couplers to reduce electrical cross-talk.

The previously mentioned filter plates or reflector plates are common measures in interferometry and are known as "Etalon". It is known to use them in WDM (wavelength division multiplexing) transceivers (vide Y. Yamada et al., OFC '95, Post Deadline Paper 12).

This variant of the invention adds a further genus to the circuit structures in accordance with the previously described embodiments functioning as transmitter/receiver modules as well as as add/drop multiplexers/demultiplexers for transmitters and receivers. The architectures of the active and passive components in this further genus can no longer be applied as integrated circuit but rather as individual components of a hybrid planar lightwave circuit (PLC= planar lightwave circuit). In such PLC's, the planar-optical waveguide network circuits and the planar optoelectronic laser and photo detector circuits may each be constructed in integrated technology.

In this respect, the simplification of the architectures in respect of the wavelength-selective filters is of particular significance. All the planar-optical waveguide network circuits may be structured on the basis of like principles substantially independent of the range of intended wavelengths. Their assembly is carried out be adding given specific planar optoelectronic laser diode and/or photo diode circuitry.

In respect of the operation of the optoelectronic circuits and their components which operation is equally applicable to this variant of the invention, reference is made to the explanations set forth above. This is particularly true of MMI couplers (MMI: multi mode interference), photo diodes used as light signal detectors, as well as those which are transparent to a first wavelength and absorbent in respect of a second wavelength, and single-mode laser diodes used as light signal sources. Because the operation of the reflective plates independent of polarization and in contrast to the previously described embodiments, all those arrangements necessary for separately affecting the TE and TM polarization of light may be avoided.

An especially advantageous embodiment provides for fabrication of basic cells of planar-optical waveguide networks in silica-on-silicon technology and of basic cells of planar optoelectronic laser and photo diode switching circuits in InP technology and to arrange them on a carrier plate. Such basic cells are based upon proven technologies; they provide for an economically feasible effort of fabrication even at small production runs; and they are even suitable for polymer waveguide technologies which at present are still in their development stage.

The waveguides of third and fourth branches of two series-connected couplers of one stage of the light waveguide arrangement extend parallel to each other and each carry the same wavelength proportions of the optical signal. This results in the expedient possibility to structure the filters in the third and fourth branches of the light waveguide arrangement as a one-piece dielectric filter plate.

These narrow band thin optical filter plates reflecting may be arranged and affixed in a simple and effective way if the carrier plate is provided with a sawed slot for supporting the filter plate. The support substrate contains the planar waveguides and it is the support chip for the photo diode and for the laser diode switching circuit. It also receives external glass fibers in a V-notch. The sawed slot is to configured such that its cutting surfaces relative to the planar waveguides are of optical quality. The filter plates may be affixed by an optical adhesive which preferably is of the same refractive index as the material of the planar-optic waveguide network circuit and the filter plate. In that manner, no disturbing reflections and scattering will arise.

As in the previously described functions in respect of add/drop components a particularly advantageous modular construction also results in respect of the embodiments of the hybrid variant here under discussion, in which a Mach-Zehnder arrangement is assembled from at least three basic cells, i.e. two series-connected passive basic cells of planar-optic waveguide networks, as, for instance, MMI couplers each having four branches, as well as a filter plate arranged therebetween and at least one optoelectronic basic cell, i.e. a laser diode switching circuit or a photo diode switching circuit. In this respect, it is to be particularly noted that regardless of the desired number of stages the first of the cascading stages is provided with a photo diode switching circuit, the last stage is provided with a laser diode switching circuit, and all intermediate stages are provided with both kinds of such switching circuits.

DESCRIPTION OF THE SEVERAL DRAWING

Advantageous embodiments or will hereinafter be described in more detail, together with the description of the preferred embodiments of the invention, with reference to the drawings, in which.

DETAILED DESCRIPTION OF PREFERRED EMBODIMENTS

Figure 1:
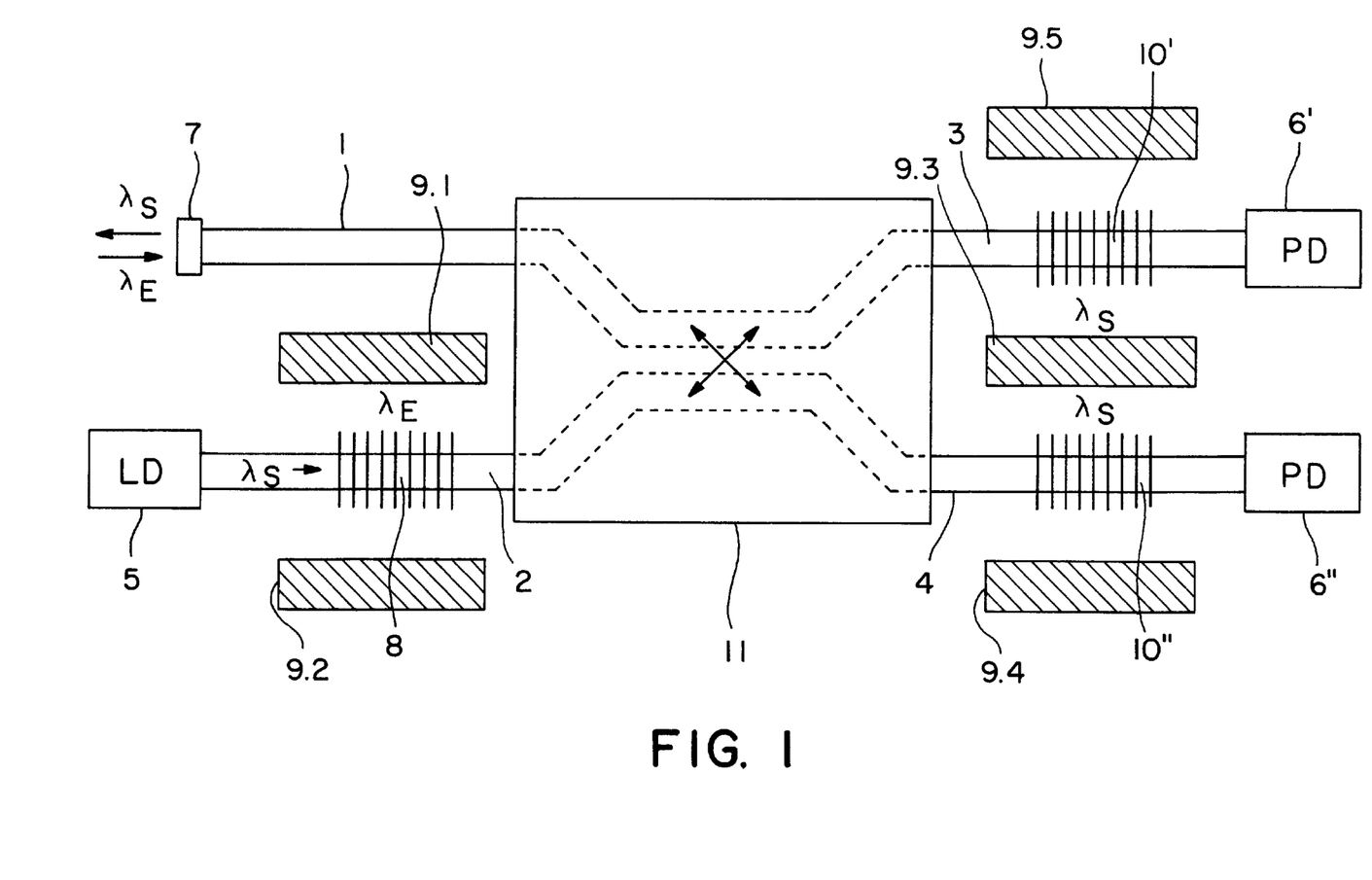
FIG. 1 is a block circuit diagram of a preferred embodiment of an integrated optoelectronic bidirectional transceiver.

The transceiver depicted in FIG. 1 serves to transmit data by way of a common external light waveguide and permits simultaneous transmitting and receiving operations. To this end, a wavelength multiplexing process is used, i.e. data is received, for instance, at a wavelength of $\lambda_E$=1,300 nm, whereas transmission is correspondingly carried out at a wavelength of $\lambda_S$=1,500 nm. In that manner transmitted and received data may be separately processed at any time.

To generate the light signals to be transmitted the transceiver is provided with a laser diode 5, whereas for detection of light signals there are provided two photo diodes 6', 6". Instead, a large surface photo diode PD may be used to detect the light fed to it by way of two waveguide branches 3, 4 (hereinafter called "branch") of a coupler 11. The entire circuit may be monolithically integrated.

Furthermore, the transceiver is provided with an interface 7 to which the external light waveguide is connected and at which the light signals to be transmitted are coupled out or into which the light signals to be received are coupled. This interface 7 is provided with a mode transformer 12 (vide FIG. 3) ensures a light coupling with as low a loss as possible and with an adjustment tolerance.

The interface 7, the photo diodes 6', 6" as well as the laser diode 5 are connected to a light waveguide arrangement which enables transmission of the light signals emitted by the laser diode 5 to the interface 7 and, in reverse, a transmission of light signals entering at the interface 7 to the photo diodes 6', 6". The light waveguide arrangement consists of four branches 1, 2, 3, 4, the first branch 1 being connected to the interface 7, the second branch 2 being connected with the laser diode 5, and the third and fourth branches 3 and 4 being each connected to a photo diode 6' and 6".

The four branches 1, 2, 3, 4 of the light waveguide arrangement are connected by a 3 dB MMI coupler 11 (MMI—multi mode interference) which couples a light signal emanating from one of its branches in equal propositions into the two branches at the opposite side of the coupler 11. For instance, a light signal entering the coupler from the second branch 2 is coupled in equal proportions into the third branch 3 and fourth branch 4. The partial light signals in the third and fourth branches 3 and 4 have a phase difference of ¼.

If a light signal of wavelength $\lambda_E$ is present at the interface 7, the light signal will first be coupled into the first branch 1 and then passes through the 3 dB MMI coupler 11 where 50% of its intensity are coupled into the third branch 3 and 50% of its intensity are coupled into the fourth branch 4.

In both the third branch 3 and the fourth branch 4 there is arranged a wavelength-selective grating reflector structured as a band-pass filter stop 10', 10". These grating reflectors 10', 10" are structured so that light of the transmission wavelength $\lambda_S$ is reflected, whilst light of another wavelength may pass almost unattenuated. The received light signal of wavelength $\lambda_E$ thus passes the grating reflectors 10', 10" substantially unattenuated and is detected by photo diodes 6', 6" arranged downstream. Moreover, in the area between the band-pass filter stops 10', 10" and the photo diodes 6', 6" the light waveguides of the third and forth branches 3 and 4 may have a reduced cross-sectional surface where only those light waves may be propagated the wavelength of which is less than the so-called cut-off wavelength.

The light signal of wavelength $\lambda_S$ emitted by the laser diode 5 initially enters the second branch 2 of the light waveguide arrangement and passes the wavelength-selective grating reflector 8 substantially unattenuated since the reflector is tuned to the receiving wavelength $\lambda_E$. Thereafter, the light signal traverses the 3 dB MMI coupler 11 where 50% of the light signal is coupled into each of the third and fourth branches 3 and 4.

Within the third and fourth branches 3 and 4, the light signal emitted by the laser diode 5 is almost totally reflected by the wavelength-selective grating reflectors 10', 10" and passes for a second time through the 3 dB MMI coupler 11, in the opposite direction. At the same time, almost the entire intensity of the light signal reflected at the grating reflectors 10', 10" is coupled into the first branch 1, and finally it is coupled out into the external light waveguide at the interface 7. In this connection, it is important that the light reflected at the wavelength-selective grating reflectors 10', 10" is not coupled back into the second branch 2 connected with the laser diode 5 as it might lead to disturbance of the single-mode laser 5. The previously mentioned grating reflector 8 contributes additional safety in this respect.

Laterally of the second, the third and the fourth branches 2 and 3 and 4 there are provided absorbers 9.1, 9.2, 9.3, 9.4 and 9.5 which consist of a semiconductor compound of the kind absorbing light of wavelength $\lambda_S$. This prevents scattered light from the laser diode 5 from reaching the photo diodes 6', 6" which would disturb the electric output signal of the photo diodes 6', 6". These absorbers may structurally be combined with heating elements for providing temperature-dependent tuning of wavelength-selective components.

Figure 2:
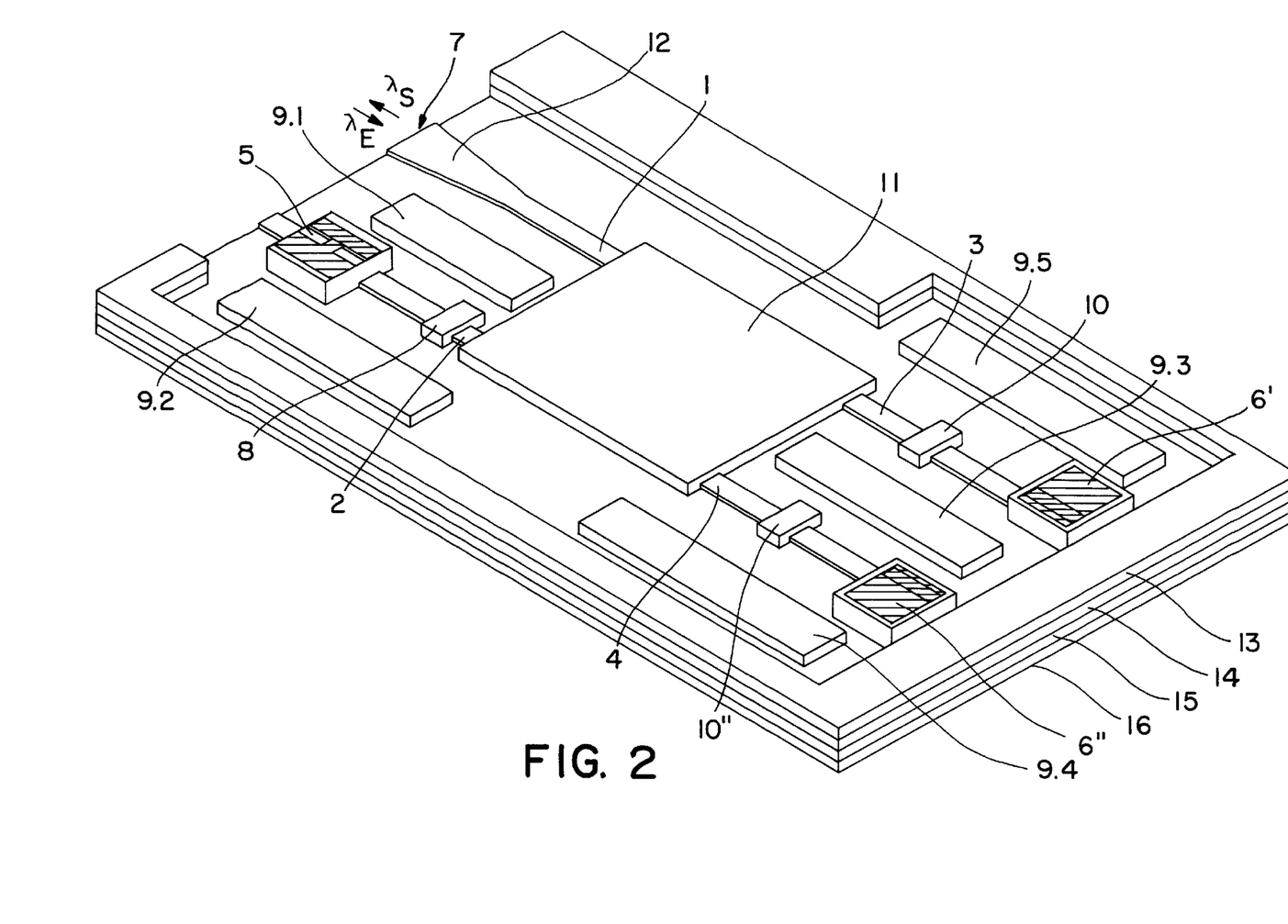
FIG. 2 is a perspective view of the transceiver of FIG. 1.

In FIG. 2 the structure of the of the multiplex transceiver of FIG. 1 is shown in perspective. The transceiver is structured as an integrated circuit fabricated of several layers 13, 14, 15, 16 which are successively stacked during assembly. The integrated circuit is shown in schematic elevation to depict the extent of the layers in the interior of the circuit.

The photo diodes 6', 6" and the laser diode 5 form islands within the layer structure leading up to the surface thereof so that the laser diode 5 and the photo diodes 6', 6" may be electrically contacted directly at the upper surface.

The light waveguide arrangement in essence consists of the four branches 1, 2, 3, 4 of the coupler 11. The first branch 1 is leading to the exterior of the circuit where it forms the connection with the external light waveguide. The second branch 2 is connected to the laser diode 5, the third branch 3 and the fourth branch 4 are each connected to a photo diode 6', 6". In this manner, the light signals emitted by the laser diode 5 may on the one hand be transmitted to the interface 7 and, on the other hand, the light signals received at the interface 7 may be transmitted to the photo diodes 6', 6".

The 3 dB MMI coupler 11 arranged in the center of the circuit connects the four branches 1, 2, 3, 4 with each other and couples a light signal entering the coupler 11 from one of the branches, in equal proportions into the branches at the opposite side of the coupler 11. Thus, light entering the 3 dB coupler 11 from the first branch 1 is coupled into the third branch 3 as well as the fourth branch 4.

When it is operating as a receiver, a light signal of wavelength $\lambda_E$ enters the integrated circuit at the interface 7 and is fed to the 3 dB coupler 11 by the first branch of the light waveguide arrangement. The 3 dB coupler 11 then couples 50% of this light signal into the third branch 3 and 50% into the fourth branch 4. The light signal of wavelength $\lambda_E$ passes almost unattenuatedly through the wavelength-selective reflectors 10', 10" arranged in the third and fourth branches 3 and 4 as they are tuned to the transmission wave length $\lambda_S$. Finally, the light signal reaches the two photo diodes 6', 6" and is reflected.

During a simultaneously possible transmitting operation the laser diode 5 emits a light signal of wavelength $\lambda_S$, which is initially fed by the second branch 2 of the light waveguide arrangement to the 3 dB MMI coupler which couples the light signal in equal proportions into the third and fourth branches 3 and 4. There, the light signal of wavelength $\lambda_S$ is almost totally reflected at the wavelength-selective reflectors 10', 10" and passes through the coupler 11 for a second time in the opposite direction.

Almost the entire intensity of the light signal to be transmitted is coupled into the first branch 1 and is from there fed to the interface 7 for transmission.

The diameter of the external light waveguide is substantially larger than the width of the first branch 1 of the light waveguide arrangement. In the transmission operation, this results in a relatively low coupling factor without any special measures, i.e. a relatively low intensity only is fed into the external light waveguide. The first branch 1 is therefore structured as a mode transformer 12 immediately ahead of the interface. Such a mode transformer 12 is characterized by a changing width of the light waveguide in the direction of light propagation. In this manner the coupling factor between the external light waveguide and the first branch 1 of the light waveguide arrangement is increased.

The wavelength-selective reflectors 10', 10" are structured as Bragg reflectors. To this end, the interface in the vicinity of such a Bragg reflector between the light waveguide and the surrounding material is formed as a corrugated i.e. wave-like structure. Its wave crests and wave troughs are equidistant and extend substantially at a right angle to the direction in which the light waveguide is extending. The distance between two wave crests or between two wave troughs, the so-called corrugation period, is chosen in the Bragg reflectors 10', 10" so as to reflect the transmission wavelength $\lambda_S$.

In connection with the previously described arrangement of waveguides in the third and fourth branches 3 and 4 of reduced cross-sectional surface area, the area of the waveguides in the immediate vicinity of the photo diodes 6', 6" is significant for another reason. If these areas of the waveguides 6', 6" are provided with an absorption element consisting, for instance, of a layer of quarternary semiconductor material having a band gap corresponding to 1.4 $\mu$m, a complementary transceiver may be realized which is substantially of the structure shown in FIG. 2 and which utilizes 1.3 $\mu$m wavelengths for transmitting and 1.5 $\mu$m wavelengths for receiving.

Figure 3:
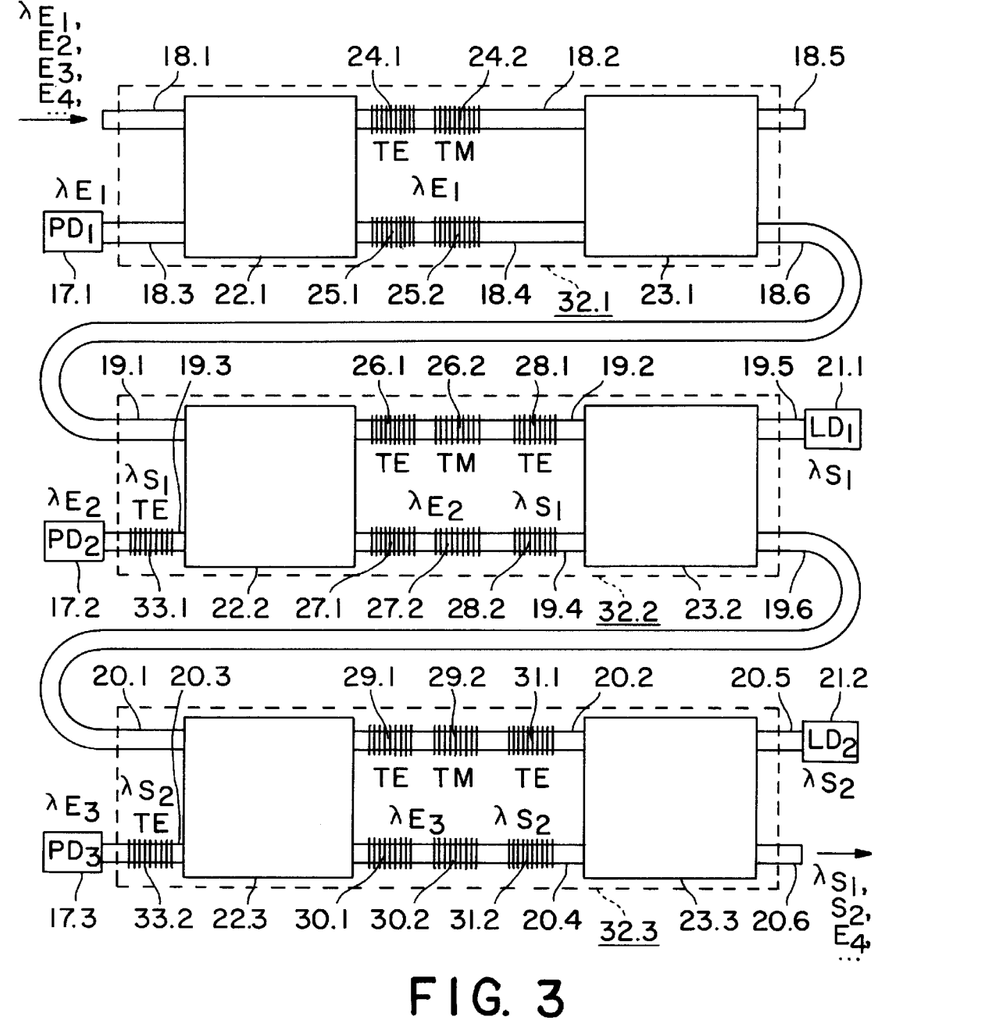
FIG. 3 is a block circuit diagram of an integrated optoelectronic multi-channel add/drop circuit in a cascading arrangement.

The monolithically integratable optoelectronic multichannel add/drop circuitry (add/drop OEIC) makes it possible successively to detect (drop), for instance, three channels of a light waveguide having different wavelengths $\lambda_{E1}$, $\lambda_{E2}$, $\lambda_{E3}$ and to couple into the light waveguide (add) a new signal of the wave-length $\lambda_{S1}$, or $\lambda_{S2}$ detected immediately previously.

Such an add/drop OEIC consists of three stages 32.1, 32.2, 32.3, each stage detecting one channel. The three stages 32.1, 32.2 32.3 are connected in succession, so that in one stage one channel each is detected (drop) and in the following stage the channel with the same wavelength may be charged with new data (add).

Each stage 32.1, 32.2, 32.3 is provided with a light waveguide arrangement having six branches 18.1, ... 18.6; 19.1 ... 19.6 and 20.1 ... 20.6. of light waveguides and two 3 dB MMI couplers 22.1 ... 22.3 and 23.1 ... 23.3.

The first branch 18.1 of the first stage 32.1 serves to connect the external light waveguide by which the incoming light signals are received, whilst the first branch 19.1, 20.1 of the following stages 32.2 and 32.3 serves for connection to the sixth branches 18.6 and 19.6 of the preceding stage 32.1 and 32.2.

The second branch 18.3, 19.3, 20.3 is in each stage 32.1, 32.2, 32.3 connected to a photo diode 17.1, 17.2, 17.3, each photo diode detecting one channel. (N.B.: In FIG. 3 the second branches have been shown with terminal digit "2" and third branches are shown with terminal digits 3 of the reference numerals.)

The first 3 dB MMI coupler 22.1, 22.2, 22.3 of each stage couples equal proportions of light signals entering the light waveguide arrangement by a first branch 18.1, 19.1, 20.1 or by a second branch 18.3, 19.3, 20.3 into the third branches 18.2, 19.2, 20.2 and into the fourth branches 18.4, 19.4, 20.4. In this manner a light signal coming from the first branch 18.1, for instance, is coupled at 50% intensity into the third branch 18.2 and at 50% intensity into the fourth branch 18.4.

In each of the third branches 18.2, 19.2, 20.2 and fourth branches 18.4, 19.4, 20.4 there is provided a wavelength-selective reflector 24.1, 24.2, 25.1, 25.2, 26.1, 26.2, 27.1, 27.2, 29.1, 29.2, 30.1, 30.2, these reflectors being tuned in the first stage to wavelength $\lambda_{E1}$ of the first channel, in the second stage to wavelength $\lambda_{E2}$ of the second channel, and in the third stage to wavelength $\lambda_{E3}$ of the third channel. Each one of these reflectors consists of a wavelength-selective waveguide grating, whereby one grating is used for each of the TE mode and of the TM mode because of the polarization dependency of the gratings.

The third branch 18.2, 19.2, 20.2 and the fourth branch 18.4, 19.4, 20.4 of each stage are respectively connected to the fifth branch 18.5, 19.5, 20.5 and to the sixth branch 18.6, 19.6, 20.6 by way of a second 3 dB MMI coupler 23.1, 23.2, 23.3. The sixth branch 18.6, 19.6 of the two first stages is connected with the first branch 19.1, 20.1 of the successive stage, whereas the sixth branch 20.6 of the third stage 32.3 is connected to the external light waveguide by which the light signals are transmitted. It this position, a last stage may be provided instead (vide FIG. 6) where no light signal can be detected but where a light signal may be generated which is of the wavelength detected in the last stage but one.

The fifth branch 19.5, 20.5 of the light waveguide arrangement is connected at the second and third stages 32.2, 32.3 with a laser diode 21.1, 21.2, whereby the laser diode 21.1 of the second stage 32.2 emits light of wavelength $\lambda_{S1}$ of the first channel, whilst laser diode 21.2 of the third stage emits light of wavelength $\lambda_{S2}$ of the second channel.

In the third branch 19.2, 20.2 and in the fourth branch 19.4, 20.4 of the light waveguide arrangement there is provided a further wavelength-selective reflector 28.1, 28.2, 31.1, 31.2 in each of the second and third stages 32.2, 32.3, whereby the reflector 28.1, 28.2 of the second stage 32.2 is tuned to wavelength $\lambda_{S1}$ of the first channel and reflector 31.1., 31.2 of the third stage 32.3 is tuned to wavelength $\lambda_{S2}$ of the second channel.

At the input interface of this three-channel add/drop OEIC a light signal is received from the external light waveguide which includes components of wavelengths $\lambda_{S1}$, $\lambda_{S2}$, $\lambda_{S3}$ of the three channels.

This signal is initially coupled into the first branch 18.1 of the first stage 32.1 and passes through the 3 dB MMI coupler 22.1 which couples this signal in equals proportions into the third branch 18.2 and fourth branch 18.4 of the light waveguide arrangement. There, the first channel of wavelength $\lambda_{E1}$ is reflected at the wavelength-selective reflectors 24.1, 24.2, 25.1, 25.2 and passes through the 3 dB MMI coupler 22.1 for a second time, in the opposite direction. Almost the entire intensity of the first channel is then coupled into the second branch 18.3 and thus reaches the photo diode 17.1 of the first stage 32.1.

The channels of wavelengths $\lambda_{E2}$ and $\lambda_{E3}$, however, pass through the wavelength-selective reflectors 24.1, 24.2, 25.1, 25.2 substantially unattenuated and are almost completely coupled into the sixth branch 18.6 by the second 3 dB MMI coupler 23.1. From there, the light signal which still contains the second and the third channel is coupled into the first branch 19.1 of the second stage 32.2.

The first stage 32.1 thus filters the first channel of wavelength $\lambda_{E1}$ out of the input signal, and it also detects it. However, for light signals of another wavelength the first stage 32.1 is substantially transparent.

Analogously, the second channel is filtered out and detected in the second stage. Thus, in the second stage 32.2 the light signal is initially coupled into the third and fourth branches and 19.4. There, the light signal of the second channel is reflected at the wavelength-selective reflectors 26.1, 26.2, 27.1, 27.2 and passes through the 3 dB MMI coupler 22.2 for a second time, in the opposite direction. Substantially the entire intensity of the second channel is coupled into the second branch 19.3 and fed to the photo diode 17.2 of the second stage 32.2.

The other light signals pass through the wavelength-selective reflectors 26.1, 26.2, 27.1, 27.2 substantially unattenuatedly and are coupled almost entirely into the sixth branch 19.6 by the second 3 dB MMI coupler 23.2 of the second stage 32.2 and are thus fed to the third stage 32.3.

The fifth branch 19.5 of the second stage 32.2 is connected with a laser diode 21.1 which emits light of wavelength $\lambda_{S1}$ of the first channel. This light is initially coupled into the fifth branch 19.5 and passes through the second 3 dB MMI coupler 23.2. Thus, 50% of the intensity of the emitted light is coupled into each of the third branch 19.2 and the fourth branch 19.4 of the light waveguide arrangement, and are there reflected by the wavelength-selective reflectors 28.1, 28.2. The light signal emitted by the laser diode 21.1 thus passes through the 3 dB MMI coupler 23.2 for a second time, in the opposite direction, almost the entire intensity being coupled into the sixth branch 19.6 and reaching the third stage 32.3.

Thus, the second stage 32.2 filters the second channel out of the light signal received from the first branch; it detects this channel with a photo diode 17.2 and charges the first channel with a new light signal from a laser diode 21.1.

The sixth branch 19.6 of the second stage is connected to the first branch 20.1 of the third stage 32.3 is structured similarly to the second stage 32.2.

The light signal entering the third stage 32.3 initially passes through the first 3 dB MMI coupler 22.3 whereby 50% of the intensity are coupled into each of the third branch 20.2 and fourth branch 20.4. Light of wavelength $\lambda_{E3}$ of the third channel is reflected and passes through the 3 dB MMI coupler 22.3 for a second time, in the opposite direction. Almost the entire intensity of the reflected light is coupled into the second branch 20.3 and fed to the third photo diode 17.3.

Light of another wavelength passes through the wavelength-selective reflectors 29.1, 29.3, 30.1, 30.2 substantially unattenuatedly and passes through the second 3 dB MMI coupler 23.3 which couples substantially the entire intensity of the passed light into the sixth branch 20.6 and thus feeds it to the output interface where the light is coupled into the external light waveguide.

A further laser diode 21.2 is provided in the fifth branch 20.5 of the third stage 32.3. The laser diode 21.2 emits light of wavelength $\lambda_{S2}$ of the second channel. This light traverses the second 3 dB MMI coupler 23.3 whereby the light signal emitted by the laser diode 21.2 is coupled in equal proportions into the third and fourth branches 20.2 and 20.4 of the light waveguide arrangement.

A further wavelength-selective reflector 31.1, 31.2 is arranged in each of the third and fourth branches 20.2 and 20.4 which is tuned to the wavelength $\lambda_{S2}$ of the second channel. The light signal emitted by the laser diode 21.2 is thus reflected in the third and fourth branches 20.2 and 20.3 and passes through the second 3 dB MMI coupler 23.3 again in the opposite direction, whereby almost the entire intensity is coupled into the sixth branch 20.6 and fed to the transmission interface.

For reducing optic cross-talk from the laser diodes 21.1, 21.2 to the photo diodes 17.2, 17.3 a wavelength-selective reflector 33.1 and 33.2 is arranged in each of the second branches 19.3 and 20.3 in the second and third stages 32.2 and 32.3. In the second stage, the reflector is tuned to wavelength $\lambda_{S1}$ of the first channel, and in the third stage 32.3 it is tuned to wavelength $\lambda_{S2}$ of the second channel.

The multi-channel add/drop circuit is structured as an opto-electronic monolithically integrated circuit. The three optically series-stages 32.1, 32.2, 32.3 are assembled in side by side relationship such that the photo diodes 17.1, 17.2, 17.3 are positioned at one side of the chip and the laser diodes 21.1., 21.2 are positioned at the other side of the chip. The distance between the photo diodes 17.1, 17.2, 17.3 and the laser diodes 21.1, 21.2 is thus maximized, and electric cross-talk is reduced. In front of the photo diodes 17.2, 17.3 at the waveguide branches 19.3, 20.3 there are provided, for optical decoupling, wavelength-selective reflectors 33.1, 33.2 for each given wavelength of transmitting operation $\lambda_{S1}$, $\lambda_{S2}$ as well as TE polarization. Furthermore, a compact structure of the circuit is achieved by the arrangement of the individual stages 32.1, 32.2, 32.3, as the spatial dimension of the individual stages 32.1, 32.2, 32.3 in the lateral direction is substantially smaller than in the longitudinal direction.

The figures described hereafter relate to embodiments of the invention of hybrid construction. With a view to avoiding repetition reference is made to the previous descriptions as regards explanations of functions of these embodiments which substantially conform to those of the previously described embodiments.

Figure 4:
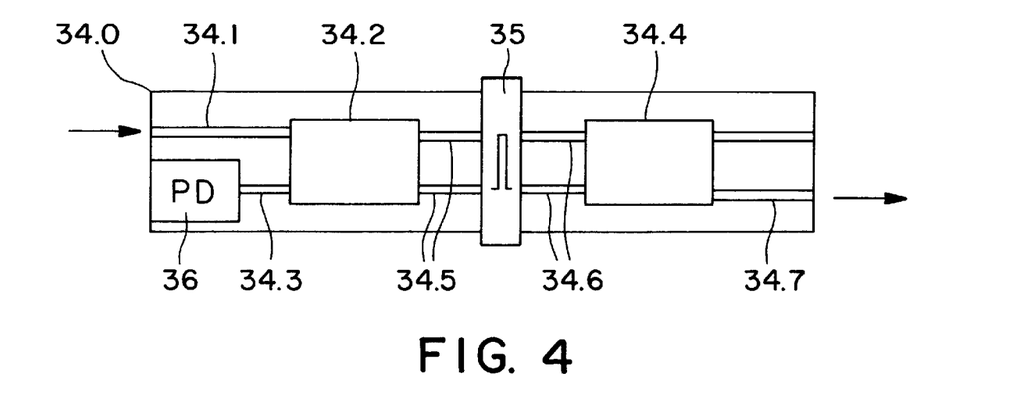
FIG. 4 is a receiver module.

An optical WDM signal (WDM: wavelength division multiplex) signal is fed to the PLC receiver module 34.0 (PLC : planar lightwave circuit) fabricated in hybrid technology and depicted in FIG. 4, and transmitted by an input waveguide 34.1 to a first 3 dB coupler 34.2. From there, the signal reaches a narrow-band reflective thin optic filter plate 35 at the opposite side of the 3 dB coupler 34.2, in equal proportions, by way of two parallel connecting waveguides 34.5. The signal which is wavelength-selectively reflected at the filter plate 35 passes through the first 3 dB coupler 34.2 in the opposite direction and thereafter a feed waveguide 34.3 to which a photo diode switching circuit 36 is connected for processing the selected optic signal.

Structural details of the arrangement and affixing of the filter plate 35 will be set forth in greater detail in connection with the description of FIG. 8.

The wavelength proportions in the WDM signal which are transmitted by the filter plate 35 are fed into two parallel connector waveguides 34.6 and from there to a second 3 dB coupler 34.4. A Mach-Zehnder interferometer structure is thus created during transmission. The previously mentioned transmission portions are available for further processing at an output waveguide 34.7.

Figure 6:
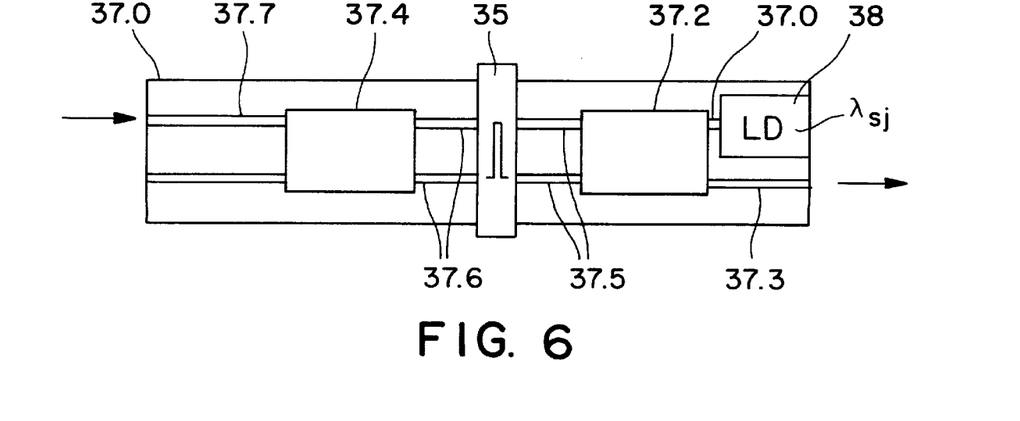
FIG. 6 is a transmitter module.

Similar to the description of the PLC receiver module 34.0, the PLC transmitter module 37.0 depicted in FIG. 6 will be initially described. The optic signal emitted by a laser diode switching circuit 38 is fed to a second 3 dB coupler 37.2 by a feed waveguide 37.1. From there it is fed in equal proportions by connector waveguides 37.5 to the filter plate 35 where it is wavelength-selectively reflected. The reflected laser signals pass in an opposite direction through the connector waveguide 37.5 and the second 3 dB coupler 37.2, and combined to a WDM signal they reach an output waveguide 37.3.

Wavelength portions of the optic WDM signal not reflected by the filter plate 35 may be fed to the PLC transmitter module 37.0 by way of an input waveguide 37.7. They will be fed into a first 3 dB coupler 37.4, from there they will be fed in equal proportions to a connector waveguide 37.6 and pass the filter plate 35. On their way through the connecter waveguides 37.5 the wavelength portions are combined in a in the second 3 dB coupler 37.2 (Mach-Zehnder interferometer principle) and in the output waveguide 37.3 they are heterodyned with the signal generated by the laser diode switching circuit 38, in wavelength multiplex.

The filter plates 35 of the modules 34.0 of FIG. 4 and 37.0 of FIG. 6 are each individually tuned to the working wavelength of the photo diode switching circuit 36 or of the laser diode switching circuit 38 and may be fabricated as one-piece structures. Both modules 34.0 and 37.0 are part of a unit, or the first and the last stage of a cascade, as the case may be. Intermediate stages of the cascade dimensioned to predetermined wavelengths to be selected, will be described hereafter.

Figure 5:
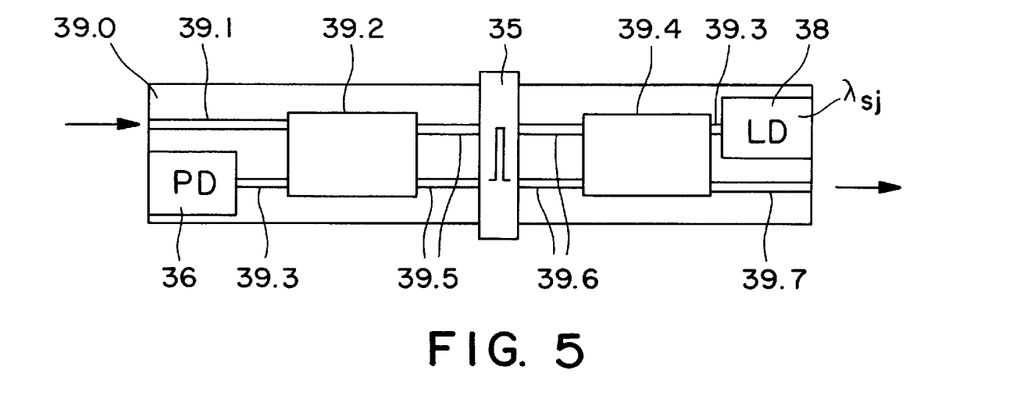
FIG. 5 is a receiver/transmitter module.

Combining a PLC receiver module 34.0 of FIG. 3 and a PLC transmitter module 37.0 of FIG. 6 results in a so-called unidirectional transceiver. In this respect, FIG. 5 depicts a PLC receiver/transmitter module 39.0. There a provided an input waveguide 39.1, a first 3 dB coupler 39.2, two feed waveguides 39.3 one leading to the photo diode switching circuit 36 and the other leading to the laser diode switching circuit 38, A second 3 dB coupler 39.4, connector waveguides 39.5 and 39.6 as well as an output waveguide 39.7. The operating modes of the receiver and of the transmitter may each be taken by reference to the previous descriptions relating to FIG. 4 and FIG. 6.

With a view to attaining as little optic cross-talk as possible the operating wavelengths of the detecting photo diodes and of the emitting laser diodes within a receiver/transmitter module of the kind depicted in FIG. 5 should be different. Thus, having regard to the PLC receiver/transmitter module 39.0, there should either be provided two filter plates 35 for each one of the operating wavelengths or, in case of closely adjacent working wavelengths of photo diode and laser diode, about twice the bandwidth of the two wavelengths to be selected.

The modules 34.0, 37.0 and 39.0 depicted in FIG. 4, 5 and 6 each contain two series-connected passive basic cells of planar-optic waveguide networks, each with a 3 dB coupler having two branches at one side and two branches at the opposite side. Furthermore, these modules contain at least one opto-electronic basic cell. In a PLC receiver module 34.0 this basic cell is a photo diode switching circuit 36, and in a PLC transmitter module 37.0 it is a laser diode switching circuit 38. a PLC receiver/transmitter module 39.0 is provided with a photo diode switching circuit 36 as well as a laser diode switching circuit 38. Basic cells of planar-optic waveguide networks may be fabricated in silica on silicon technology, and basic cells of planar-optoelectronic laser diode and photo diode switching circuits may be fabricate in InP technology, and they may be arranged on a common carrier plate.

Figure 7:
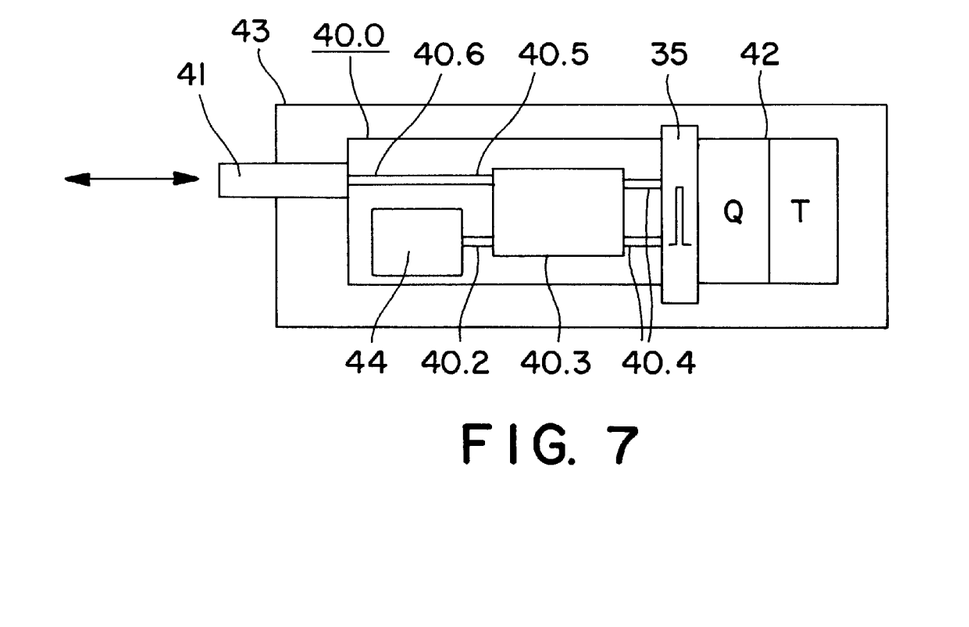
FIG. 7 is a bidirectional receiver/transmitter module.
Figure 8:
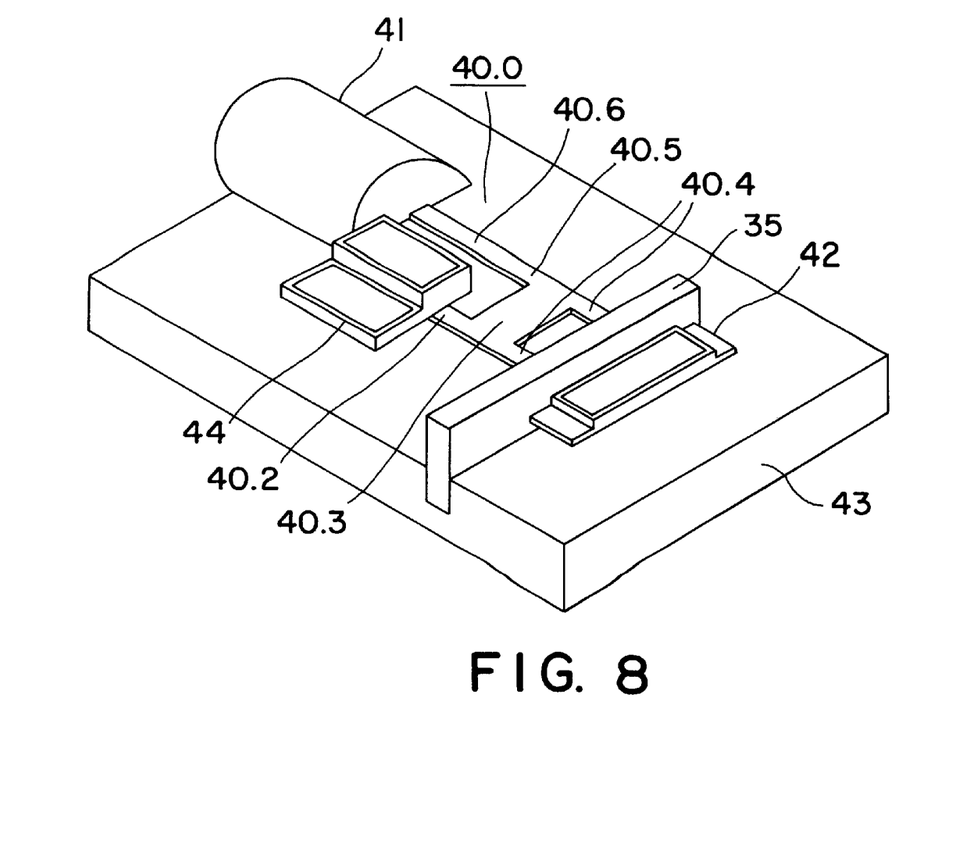
FIG. 8 is a perspective view of the module of FIG. 7.

FIGS. 7 and 8 depict a bidirectional receiver/transmitter module (transceiver) 40.0 in hybrid structural technology. For transmission and reception, it operates on selected different wavelengths. The signals are transmitted in both directions by a common glass fiber 41. Together with the bidirectional receiver/transmitter module 40.0, the glass fiber 41 is mounted on a carrier plate 43. As regards complementary transceivers as well as additional transmission of distributer services, signalizing channels and the like, reference is made to the corresponding previous descriptions.

Signals received are carried in an input/output waveguide 40.5 structured by a mode transformer 40.6 for optical field expansion, are fed to a 3 dB coupler 40.3 and from there in equal proportions into two parallel connector waveguides 40.4. a filter plate 35 is provided there which lets this signal pass to a photo diode switching circuit 42. An optic signal to be transmitted is generated in a laser diode switching circuit 44 and is fed to the 3 dB coupler 40.3 by a feed waveguide 40.2. This signal is fed from there in equal proportions into the connector waveguides 40.4. The filter plate 35 selects, i.e., it reflects this wavelength so that the reflected laser signal returns to the 3 dB coupler 40.3 which heterodynes the two portions of the laser signal. The output signal is fed into the glass fiber 41 by way of the input/output waveguide 40.5 and the mode transformer 40.6.

Structural details and measures for supporting a fixing the filter plates 35 which are true for all embodiment of the invention fabricated in hybrid technology may be clearly derived from FIG. 8. The filter plate 35 may be supported an fixed in a slot sawed into the support plate 43 and which also contains the planar waveguides 40.2, 40.4, 40.5 and 40.6 as well as the coupler 40.3, and which functions as the support chip for the photo diode and laser diode switching circuits 42 and 44 and which received the glass fiber 41 in a V notch. The sawed slot is executed with optical quality at its interfaces with the planar waveguides 43.5, 43.6, 37.5, 37.6, 39.5, 39.6 and 40.4. Any adhesive should be of substantially the same refractive index as the material of the planar-optic waveguide switching circuit and the filter plate 35. In that way, interfering reflections and scattering may be substantially avoided.

Similar structural considerations hold true for affixing the photo diode switching circuits 36 and 42. These are either inserted by impact coupling into a further sawed slot or, if an integrated planar waveguide is used, they are affixed in the plane of a feed waveguide 34.3, 37.1 and 39.3 or of the connector waveguide 40.4.

The invention is not limited in its execution to the preferred embodiments described hereinbefore. Rather, a number of variants are conceivable, which make use of the described solution even in substantially differently structured embodiments.

What is claimed is:

1. A single stage integrated wavelength multiplexing opto-electronic circuit for simultaneous bidirectional transmission and receiving operations, comprising:

an optical coupler provided with waveguide connections at opposite sides thereof;

first and second waveguides connected to the waveguide connections at a first side of the optical coupler;

third and fourth waveguides connected to the waveguide connections at a second side opposite the first side of the optical coupler and interacting within the coupler with the first and second waveguides;

a light signal source connected to at least one of the first and second waveguides and a light signal detector connected to at least one of the third and fourth waveguides, the light signal source and the light signal detector being tuned to different discrete wavelengths for transmitting and receiving;

wavelength-selective filters provided at the waveguides connected to the light signal source and the light signal detector.

2. The opto-electronic circuit of claim 1, wherein the coupler comprises a multi-mode interference coupler.

3. The opto-electronic circuit of claim 1, further comprising a wavelength selective filter between the light signal source and the coupler for reflecting only light of a receiving wavelength.

4. The opto-electronic circuit of claim 1, wherein the wavelength selective filter in the third and fourth waveguides comprises a band-pass filter stop having a blocking wavelength substantially equal to the transmission wavelength.

5. The opto-electronic circuit of claim 4, wherein the transmission wavelength is greater than the receiving wavelength and that for reducing optic cross-talk the cross-section of the third and fourth waveguides between the band-pass filter stop and the light signal detector is so small that the cut-off wavelength is below the transmission wavelength.

6. The opto-electronic circuit of claim 1, wherein the transmission wavelength is smaller than the receiving wavelength and wherein the third and fourth waveguides between the light signal detector and the coupler in the area of the band-pass filter stop and the light signal detector are provided with an absorption element comprising a quaternary semiconductor material of a band gap substantially corresponding to a wavelength between the transmission and receiving wavelengths.

7. The opto-electronic circuit of claim 1, further comprising a Mach-Zehnder arrangement constituted by a light waveguide arrangement with a first 3 dB coupler provided with four light waveguide branches and a second 3 dB coupler provided with four light waveguide branches whereby a fifth light waveguide branch is connected to the light signal source and a second light waveguide branch is connected to the light signal detector so that the inner light waveguide branches are common to the two couplers, and that a wavelength-selective reflector substantially reflecting only light of the transmission wavelength is arranged in each of the inner light waveguide branches.

8. The opto-electronic circuit of claim 7, wherein the transmission wavelength and the receiving wavelength are different and wherein in the inner light waveguide branches there are provided wavelength-selective reflectors for the corresponding receiving wavelength and TE and TM polarizations as well as wavelength-selective reflectors for the corresponding transmission wavelength and TE polarization.

9. The opto-electronic circuit of 7, wherein a wavelength-selective reflector is provided in the second and third light waveguide branch for the corresponding transmission wavelength and TE polarization.

10. The opto-electronic circuit of claim 7, wherein at least two Mach-Zehnder arrangements are cascaded as stages, whereby a sixth light waveguide branch of the preceding stage is connected to the first light waveguide branch of a successive stage, and wherein the transmission wavelengths and the receiving wavelengths at each stage are different.

11. The opto-electronic circuit of claim 1, wherein light signal detector is a photo diode.

12. The opto-electronic circuit of claim 11, wherein the photo diode is provided with a semi-conductor compound for reducing cross-talk from the light signal source, the semi-conductor compound being substantially transparent to light of the transmission wavelength and absorbing as regards light of the receiving wavelength.

13. The opto-electronic circuit of claim 1, wherein the light signal detector is divided into a first section of quarternary material and a second section of ternary material series-connected with the first section.

14. The opto-electronic circuit of claim 1, wherein adjacent to one of the light signal detectors and the light signal source there are provided absorbers for light of at least one wavelength.

15. The opto-electronic circuit of claim 1, wherein heating elements are provided adjacent to the wavelength-selective filters.

16. The opto-electronic circuit of claim 1, wherein the wavelength-selective filters are grating reflectors.

17. The opto-electronic circuit of claim 16, wherein the grating reflectors are Bragg reflectors.

18. The opto-electronic circuit of claim 1, further comprising a waveguide leading to an interface for connecting an external light guide is structured as a mode transformer at the input of the interface.

19. The opto-electronic circuit of claim 1, wherein the light signal source (5) is a single-mode laser diode.

20. The opto-electronic circuit of claim 1, wherein basic cells of planar-optic waveguide networks are fabricated in silica on silicon technology and that basic cells of planar-optoelectronic laser and photo diode switching circuits are fabricated in InP technology and that they are arranged on a support plate.

21. A single stage hybrid wavelength multiplexing opto-electronic circuit for simultaneous bidirectional transmission and receiving operations, comprising:
    an optical coupler provided with waveguide connections at opposite sides thereof;
    first and second waveguides connected to the waveguide connections at a first side of the optical coupler;
    third and fourth waveguides connected to the waveguide connections at a second side opposite the first side of the optical coupler and interacting within the coupler with the first and second waveguides;
    a light signal source connected to at least one of the first and second waveguides and a light signal detector connected to at least one of the third and fourth waveguides, the light signal source and the light signal detector being tuned to different discrete wavelengths for transmitting and receiving; and
    a wavelength-selective filter in the waveguide of the light signal detector for optically decoupling the light signal source from the light signal detector.

22. The opto-electronic circuit of claim 21, wherein the wavelength-selective filter is a one-piece dielectric filter plate (35).

23. The opto-electronic circuit of claim 22, wherein a carrier plate is provided with a sawed slot for supporting the filter plate and for securing the waveguides and constitutes a support chip for the photo diode and the laser diode switching circuit, and wherein it receives the glass fiber in a V notch.

24. A single stage integrated wavelength multiplexing opto-electronic circuit for simultaneous unidirectional transmission and receiving operations, comprising:
    first and second optical couplers respectively provided with waveguide connections at opposite sides thereof;
    first and second optical couplers first and second waveguides connected to one side of the first optical coupler;
    third and fourth waveguides interacting with the first and second waveguides in the first optical coupler and connecting an opposite side of the first optical coupler to one side of the second optical coupler;
    fifth and sixth waveguide interacting with the third and fourth waveguides in the second optical coupler and connected to the second optical coupler at a side opposite from the one side;
    a light signal detector and a light signal source tuned to different discrete wavelengths for transmitting and receiving and respectively connected to at least one of the first and second waveguides and fifth and sixth waveguides; and a wavelength selective filter for optically decoupling the light signal detector and the light signal source arranged in at least the third and fourth and one of the first and second and fifth and sixth waveguides.

25. A single stage hybrid wavelength multiplexing opto-electronic circuit for simultaneous unidirectional transmission and receiving operations, comprising:

a first and second optical couplers respectively provided with waveguide connections at opposite sides thereof;

first and second optical couplers respectively provided with waveguide connections on opposite sides thereof;

first and second waveguides connected to one side of the first optical coupler;

third and fourth waveguides interacting with the first and second waveguides in the first optical coupler and connecting an opposite side of the first optical coupler to one side of the second optical coupler;

fifth and sixth waveguide interacting with the third and fourth waveguides in the second optical coupler and connected to the second optical coupler at a side opposite from the one side;

a light signal detector and a light signal source tuned to different discrete wavelengths for transmitting and receiving and respectively connected to at least one of the first and second waveguides and fifth and sixth waveguides; and a wavelength selective filter in at least one of the third and fourth waveguides for optically decoupling the light signal detector and the light signal source.

26. A multi-stage integrated wavelength multiplexing opto-electronic circuit for simultaneous unidirectional transmission and receiving operations, comprising a plurality of successively connected stages each comprising:

first and second optical couplers respectively provided with waveguide connections at opposite sides thereof;

first and second waveguides connected to one side of the first optical coupler;

third and fourth waveguides interacting with the first and second waveguides in the first optical coupler and connecting an opposite side of the first optical coupler to one side of the second optical coupler;

fifth and sixth waveguide interacting with the third and fourth waveguides in the second optical coupler and connected to the second optical coupler at a side opposite from the one side;

a light signal detector and a light signal source tuned to different discrete wavelengths for transmitting and receiving and respectively connected to at least one of the first and second waveguides and fifth and sixth waveguides;

a wavelength selective filter for optically decoupling the light signal detector and the light signal source arranged in at least the third and fourth and one of the first and second and fifth and sixth waveguides, and wherein one of the first and second waveguides of each successive stage constitutes one of the fifth and sixth waveguides of a preceding stage.

27. A multi-stage hybrid wavelength multiplexing opto-electronic circuit for simultaneous unidirectional transmission and receiving operations, comprising a plurality of successively connected stages each comprising:

first and second optical couplers respectively provided with waveguide connections at opposite sides thereof;

first and second waveguides connected to one side of the first optical coupler;

third and fourth waveguides interacting with the first and second waveguides in the first optical coupler and connecting an opposite side of the first optical coupler to one side of the second optical coupler;

fifth and sixth waveguide interacting with the third and fourth waveguides in the second optical coupler and connected to the second optical coupler at a side opposite from the one side;

a light signal detector and a light signal source tuned to different discrete wavelengths for transmitting and receiving and respectively connected to at least one of the first and second waveguides and fifth and sixth waveguides;

a wavelength selective filter in the third and fourth waveguides for optically decoupling the light signal detector and the light signal source, and wherein one of the first and second waveguides of each successive stage constitutes one of the fifth and sixth waveguides of a preceding stage and wherein a light signal detector is provided at the other of first and second waveguides of all but the final stage and a signal light source is provided at the other of fifth and sixth waveguides of all but the first stage.

* * * * *